United States Patent Office 3,488,491
Patented Jan. 6, 1970

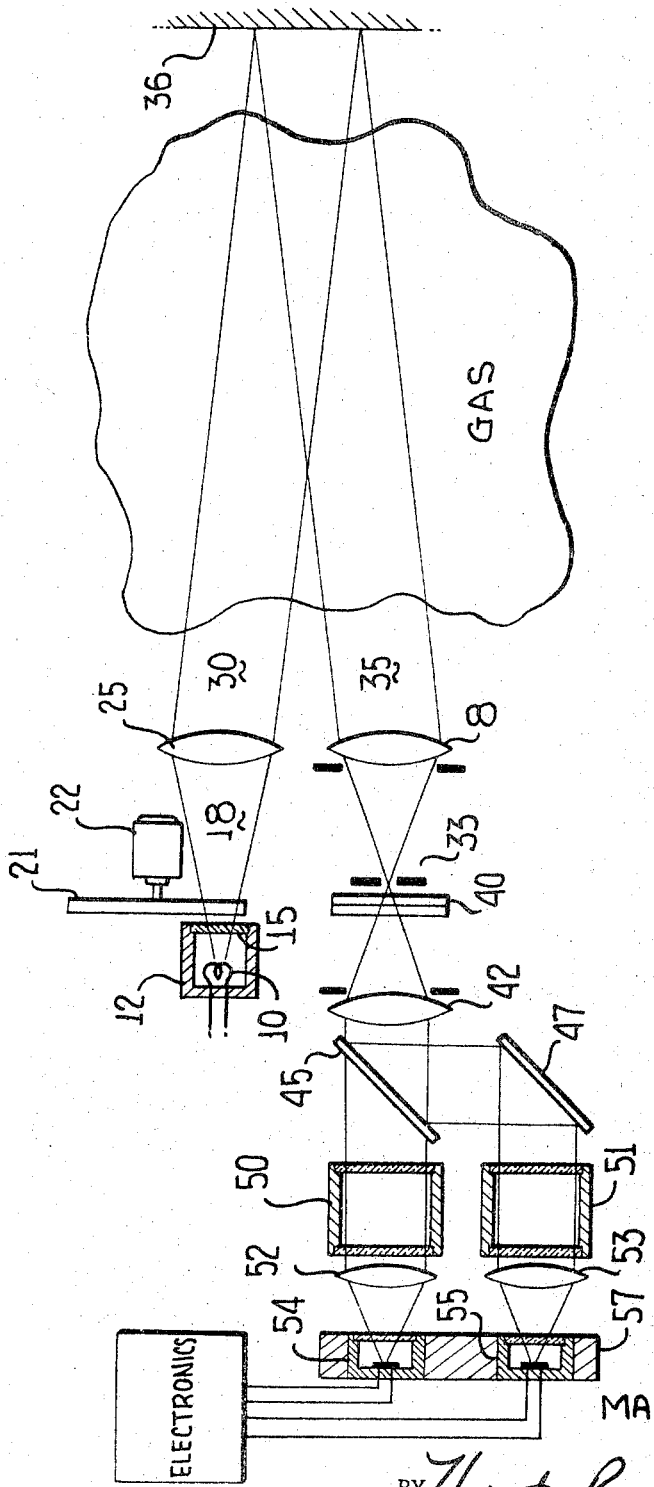
INVENTOR
MARK SCHUMAN

3,488,491
FILTER TECHNIQUES FOR GAS ANALYZERS EMPLOYING AN INERT GAS TO PRESSURE BROADEN THE ABSORPTION SPECTRUM OF GAS BEING DETECTED
Mark Schuman, Washington, D.C., assignor to Melpar, Inc., Falls Church, Va., a corporation of Delaware
Filed July 31, 1967, Ser. No. 657,144
Int. Cl. G01r 21/26
U.S. Cl. 250—43.5                                      10 Claims

ABSTRACT OF THE DISCLOSURE

A gas detection and analysis system in which interference between the gas or gases of interest and gases present in the sample under analysis which have characteristic absorption bands in common with or overlapping the gas of interest, is significantly reduced or substantially eliminated by the use of a pair of gas chambers disposed between the sample and a respective pair of detectors, or sequentially disposed between the sample and a single detector, each chamber containing the gas of interest in such concentration as to produce approximately identical gross spectral transmission curves, and one chamber containing an inert gas which broadens the rotational, vibrational, or electronic fine structure. The detector may be selective or non-selective. The technique also compensates for gross spectral effects from the radiation source or sources, components of the analyzer, radiation paths, reflective background, aerosols, and/or other gases.

BACKGROUND OF THE INVENTION

The present invention relates generally to methods of and apparatus for optical filtering in connection with gas detection and/or analysis systems, and in particular techniques of optical filtering by which to improve and enhance the sensitivity, discrimination, speed of response, ruggedness, and simplicity of instrumentation for detecting gases or complex gas mixtures.

Among the practical applications of the invention are personnel detection, leak detection (e.g., in chemical plants, processing plants, etc.), fire detection, medical analysis of human breath, and analysis of air for study or indication of pollution.

In the prior art, gas analyzers fall within either of two general categories, namely, positive type analyzers and negative type analyzers. Broadly speaking, the positive type analyzer comprises a sample cell containing the unknown gas or other substances to be analyzed, a filter cell, and a detector chamber containing a gas or other substance of interest, i.e., whose presence in the unknown substance is to be determined, each of the components arranged in the order recited in the path of a beam of rays constituting collimated radiation from a modulated source such as infrared. Another optical path is provided for a beam of the same type as that mentioned first, and includes the same general components in the same order as that in the first path, except that here the cell corresponding to the sample cell contains a reference substance or no substance, rather than the specimen to be analyzed. The two detector chambers may be employed as a pneumatic detector, in which case they are connected by a passage or duct having a flexible diaphragm midway between the chambers and providing a separation therebetween which is essentially hermetic at the frequency of the periodic modulation of the source. Accordingly, the periodic difference in pressure between the two detector chambers causes the net exertion of a periodic unbalance force on one side of the diaphragm, the oscillating movement of which is generally detected capacitively or optically.

For each path, radiation in the respective beams is absorbed according to the characteristic absorption spectra of the various substances present in the cells or chambers. Since characteristic absorption and emission lines are known for most substances, the absorption line or lines for the substance of interest may be determined in advance, and the frequency range of radiation in the beams selected accordingly. If indeed the specimen in the sample cell does contain the gas of interest, then much of the radiation of the corresponding spectral line or lines is absorbed prior to reaching the respective detector chamber. Therefore, the substance, usually a gas or mixture of gases, in the other detector chamber is heated more rapidly, absorbing radiation at the known absorption lines without substantial reduction of the radiation component at those spectral lines by preceding substances in the path. The flexible diaphragm in the passage between the two detection chambers responds accordingly and its amplitude of deflection provides a measure of the relative amount of the substance of interest in the unknown sample.

The negative type analyzer is generally similar in structure and operational mode to that of the positive type described above, except that the two beams pass through a single sample cell, and after the filter cell or cells, through separate sensitizer cells, one of which contains the substance of interest and the other an inert substance for the radiation frequency or wavelength range of the beams. Additionally, the detectors may be thermovoltaic, thermoconductive, photovoltaic, photoconductive, photoemissive, etc., rather than simple pressure chambers. The relative or differential irradiance of the detectors and the resulting differential signal is a measure of the concentration of the gas of interest, and since both beams pass through the sample cell and differential detection or measurement is performed, each detector is substantially equivalently affected by substances other than that of interest.

In both the negative and positive types of instruments, however, the presence of interfering gases or other substances, i.e., substances having the same or overlapping absorption spectra, will generally reduce the effectiveness of the analysis since they will to some extent produce an erroneous indication of amount of substance of interest present in the sample.

In one form of gas analyzer proposed in the prior art to reduce or eliminate interference resulting from the presence of substances having common absorption band characteristics with the unknown, a single sample cell is provided for the two beams, and two detector chambers each filled with a mixture of partial pressures of the gas of interest and of two overlapping components, and arranged for differential pressure. A compensator cell is provided in one radiation path and a sensitizer cell in the other, between the sample cell and detector chambers, with means for adjusting the amount of radiation entering each respective detector chamber. The sensitizer cell is filled with substance of interest at atmospheric pressure, while the compensator is filled with a gas which is inert at the radiation wavelengths utilized in the beams. By adjustment of radiation in each path, and variation of partial pressures of the overlapping components in the detector chambers, it is possible to achieve a state in which further addition of either or both of the overlapping components to the sample cell produces the same effect on both detector chambers such that the instrument is insensitive to those particular overlapping components, but is sensitive to the gas of interest.

This proposed solution to the interference problem requires, of course, that each and every overlapping component, or substance having characteristic absorption band in common with the substance of interest, be known in advance of the analysis. Even if this fortuitous situation should arise in practice, which would obviously be quite rare unless the analyzer were used for only special or particular situations, there still is present the possibility that more than one or two overlapping components are present in the sample under analysis. In that event, the balancing procedure becomes substantially more complicated for each overlapping component, because of the necessity of adjusting or varying partial pressure of each such component to arrive at the condition of sensitivity to only the substance of interest.

In addition, this method of reducing the effect of interfering components is limited to the use of gas-containing detector chambers, such as the selective pneumatic detector, which may reduce the sensitivity, ruggedness, and speed of response of the analyzer for some applications.

Another positive type gas analyzer suggested in the prior art for elimination of interference comprises a sample cell and a pair of serially or sequentially arranged, in terms of optical path, detector chambers each charged with a different partial pressure of the gas of interest. Modulated radiant energy passes through the sample cell and is then incident on the two detectors, each of which contains a pressure sensitive device to respond to the pressure changes produced by the amounts of radiant energy reaching the material in the respective detector. The second detector chamber, i.e., the last to respond to the radiant energy beam, is charged to the higher partial pressure of the gas of interest. The first detector absorbs whatever radiant energy lying in the spectral absorption bands of the sample gas was not absorbed by the sample. Accordingly, the energy transmitted to the second detector chamber is reduced in the centers of the absorption lines or bands, and the second detector is thus most responsive to energy in the wings of the lines or bands, i.e., immediately adjacent the absorption line centers. In this manner, the first detector is sensitive to sample variations whereas the second detector output signal is essentially unaffected by such variations, and both detectors respond to approximately the same extent to gross spectral effects and to interfering substances having spectra uncorrelated, in fine structure, with that of the gas or gases of interest. Hence, the differential output signal of the two detectors is generally essentially unaffected by common interfering phenomena.

It is noted that in both of the prior art positive-type analyzers mentioned above, low gas pressures are optimum, generally one atmosphere or less. Thus the degree of pressure broadening is relatively small and its effect is not the predominant mechanism of these gas analysis techniques.

The last-described technique, while generally providing automatic discrimination against unknown or unexpected interfering gases, suffers the disadvantage of the requirement of gas-containing detector chambers, and in particular, of selective pneumatic detectors. As noted earlier, such detectors limit, in a number of practical applications, the sensitivity, speed of response, ruggedness, resistance to temperature variations, and simplicity in comparison with detectors suitable for use with a negative-type analyzer.

It is therefore a broad object of the present invention to provide gas analysis filtering techniques which allow the use of any type of detector and simultaneously substantially reduce interference by overlapping components in an unknown gas mixture, in an extremely simple and efficient manner. Another object is to provide gas analysis techniques in accordance with the immediately preceding objective wherein gross spectral effects from sources internal or external to the system are automatically compensated.

SUMMARY OF THE INVENTION

Briefly, according to one embodiment of the present invention, there is provided a pair of chambers containing the gases or substances of interest, the chambers arranged in optical parallel relationship, with gas concentrations adjusted to produce approximately identical spectral transmission curves from the standpoint of gross spectral effects, but not necessarily with respect to rotational fine structure present in rotation, vibration, or electronic absorption bands. The latter spectral structure is broadened in one of the chambers by means of a spectrally inert broadening gas such as nitrogen. As a consequence, the fine structure signal arising from the presence of a gas of interest in the radiant beam produces a difference in detector signals so that the system is sensitive to the gas or gases having the fine structure as present in the chambers, but chambers are equally responsive to gross spectral effects from the radiation source or sources, components of the analyzer, radiation paths, reflective backgrounds, aerosols, or other gases, and the system thereby compensates for the latter effects.

Sensitivity, and hence response, to other gases exists only to the extent that they coincidentally have fine structure identical to or correlated with, that of gases in the chamber.

BRIEF DESCRIPTION OF THE DRAWINGS

The above and still further objects, features and attendant advantages of the present invention will become apparent from a consideration of the following detailed description of a typical embodiment thereof, especially when taken in conjunction with the accompanying drawing, in which:

The sole figure is a schematic diagram of the overall analyzer system.

DESCRIPTION OF A TYPICAL EMBODIMENT

Referring now to the drawing, there is shown one typical embodiment of the present invention for general use in gas detection. It will be understood, of course, that this is merely one of a number of potential embodiments of my invention, and is not to be taken as a limitation on the use, structure or operation of the invention, except as defined in the claims.

The system shown in the figure includes a source of radiation 10, typically infrared, disposed in an opaque housing 12 having a window 15 transparent to radiant energy of the wavelengths employed, in this example radiation in the infrared region of the spectrum. A beam of rays 18 thus emanates from the source, and is modulated by a light chopper 21, such as a rotating disc having transparent regions interrupted by opaque regions in the path of the beam, driven by a motor 22. In the event that a passive source of radiation is utilized, i.e., radiation emanating from the region in question from other than a source internal to the system, a light chopper or other means for A-C modulation of the light beam (not shown) may be used in the receiving portion of the system.

It should be noted that the term "opaque" and "transparent" are referenced to the type of radiation employed in the system.

The modulated beam impinges on a collimating lens 25 and the collimated beam 30 is transmitted across a region of space to be monitored, which region of space may or may not contain the gas or substance of interest.

The illuminated area is imaged on an aperture 33 in the receiving portion of the system by the reflected beam 35, which impinges on a condensing lens 8. The reflection of the radiant energy occurs as a result of the presence of either a mirror (e.g., 36) or background objects and other obstructions in the field of view, and includes backscattering from particles in the surrounding atmosphere. The filters 40 are selected to pass the desired spectral region containing absorption bands of the gas of interest. In the event that a non-uniform reflective background is or may be encountered, it is desirable to employ an elongated aperture (rather than that shown as 33) in the form of a hollow tube having a highly reflective internal surface (not shown), the tube following the condensing lens 8. By use of such means, effects of non-uniform reflection of the beam are averaged out in a randomizing technique.

The lens 42 is employed to collimate the received beam and direct it to a beam splitter system, including a spectrally uniform beam splitter 45 and a mirror 47, for transmission of a pair of beams through gas chambers 50 and 51, respectively. The beams emergent from the gas chambers are focused by the lenses 52 and 53 upon a pair of radiance detectors 54 and 55, respectively, which are coupled to a heat sink 57 to reduce responsivity drifts therebetween.

Each of the detectors 54, 55 may be of any conventional type for response to infrared passed by the chambers via aligned windows therein. Preferably, the detectors are connected in a bridge circuit and their difference signal is monitored by the electronics, which is tuned to the frequency and phase of the chopped source, as by synchronous rectification using conventional apparatus (not shown), and each is sufficiently large to "observe" the entire image passed via aperture 33, i.e., to respond to identical illuminated terrain or reflector area in the field, except as the radiant energy in each beam may be altered upon passage through the respective gas chambers.

One of the chambers, which like the detectors are arranged in optically parallel relationship, is filled with a mixture containing the gas of interest and may also contain an infrared inert broadening gas, such as nitrogen, having a total pressure of up to approximately one atmosphere. According, the absorption lines associated with the gas of interest are blocked while the radiance between the absorption lines is passed to that detector. The second chamber is also filled with a mixture containing the gas of interest, in somewhat lesser amount than the first chamber, and a sufficient amount of the infrared inert broadening gas to produce a total pressure of several atmospheres, e.g., at least twice the total pressure of the gases in the first chamber. The purpose of this technique is to smooth out (i.e., broaden) the absorption line structure, i.e., the fine structure, so as to enable the absorption line signal of interest to pass through the second chamber while providing substantially identical gross or unresolved spectral transmission curves for both chambers, so as to transmit equally all spectral signals uncorrelated with the fine structure of the gas in the chambers.

The output leads of the two detectors 54, 55 are connected for signal opposition, as in a bridge arrangement, to produce a difference signal which may be amplified and converted to a suitable indication of presence of the gas of interest in the area encountered by the beam, by any of the well-known apparatus arrangements (labeled "electronics" in the drawing) for that purpose.

A variable bridge adjustment may be employed for balancing the two channels insofar as detector output signals are concerned, to produce zero difference signal with no sample in the path of the beam. This zeroing adjustment may be accomplished in the system shown in the drawing by simply transmitting the beam directly to the condensing apparatus before scanning the area of interest, and can be accomplished, for example, periodically and automatically by a pair of mirrors rotating on a single shaft, not shown. In an arrangement in which a sample cell is to be placed in the optical path for analysis of the sample therein, the sample cell alternatively may be evacuated or filled with a reference substance for the balancing procedure. Thus, long term drifts may be cancelled prior to or periodically and automatically during analysis of a particular sample, to permit greater sensitivity to slight contrasts.

In order to make the system more quantitative, the sensitivity can be monitored by similarly processing the signal in the perpendicular bridge direction, thereby obtaining the sum of the detector signals rather than their difference, and therefore, for a given electronic gain, a measure of the system sensitivity.

In use of the system for analysis, the fine structure signal produces a difference in detector signals, but all other uncorrelated spectral effects produce the same signal from each detector, such that the latter effects are balanced out when the detector signals are combined in opposition.

It will be understood that regions of the spectrum other than the infrared, such as the ultraviolet, visible, and microwave regions, may be examined using the described analyzer.

While I have disclosed a particular embodiment of my invention, it will be clear that variations of the details of construction which are specifically illustrated and described may be resorted to without departing from the true spirit and scope of the invention, as defined in the appended claims.

I claim:

1. An optical analyzer for detection of a predesignated gas of interest in a region of space to be monitored, by means of radiant energy of a predetermined band of wavelengths passing through said region, said gas of interest having a known characteristic absorption spectrum over said band of wavelengths, said analyzer comprising:
   a pair of chambers at least partially transparent to radiant energy of said wavelengths, and having predetermined concentrations of said gas of interest,
   means for pressure broadening the absorption lines associated with rotational molecular transitions for said gas of interest in one of said chambers relative to the other chamber while otherwise maintaining the low-resolution spectral transmission curves of said pair of chambers substantially identical,
   means for directing a beam of said radiant energy emergent from said region through said pair of chambers, and
   means for detecting the radiant energy passed by said chambers to determine the presence or absence of said gas of interest in said region.

2. The invention according to claim 1 wherein said means for directing said beam includes means for splitting said beam into two portions for respective passage through said pair of chambers.

3. The invention according to claim 1 wherein said analyzer further includes a source of said radiant energy, and means for directing a beam of said radiant energy from said source into said region, from which said emergent beam is derived.

4. The invention according to claim 1 wherein said means for pressure broadening the absorption lines for said gas of interest comprises a spectrally inert broadening gas within said one of said chambers in sufficient quantity to provide a total pressure therein at least twice as great as the total pressure in the other chamber.

5. The invention according to claim 1 wherein said radiant energy is in the infrared region of the spectrum.

6. The invention according to claim 4 wherein said gas is nitrogen.

7. The invention according to claim 3 wherein said means for directing said emergent beam through said chambers includes means for splitting said beam into separate beams for passage through said chambers respectively.

8. The invention according to claim 7 wherein said means for pressure broadening comprises a quantity of spectrally inert broadening gas within said one chamber to provide a total gas pressure therein greater than the total gas pressure in the other chamber by at least a factor of two.

9. The invention according to claim 8 wherein said radiant energy is within the infrared region of the spectrum.

10. The invention according to claim 1 wherein is provided means for periodically modulating said beam.

References Cited

UNITED STATES PATENTS

| | | | |
|---|---|---|---|
| 2,806,957 | 9/1957 | McDonald | 250—43.5 |
| 2,849,618 | 8/1958 | Smith | 250—43.5 |
| 2,933,600 | 4/1960 | Spracklen | 250—43.5 |

RALPH G. NILSON, Primary Examiner

C. E. CHURCH, Assistant Examiner